Jan. 15, 1935.  W. G. YOUNG ET AL  1,988,030
EGG BREAKING MACHINE
Filed June 24, 1932  10 Sheets-Sheet 3

Inventors
William G. Young
Morten Hansen
Joseph F. Pollon
By
Lyon & Lyon
Attorneys Jan. 15, 1935.  W. G. YOUNG ET AL  1,988,030
EGG BREAKING MACHINE
Filed June 24, 1932    10 Sheets-Sheet 4

Inventors
William G. Young
Morten Hansen
Joseph F. Pollon
By Lyon & Lyon
Attorneys

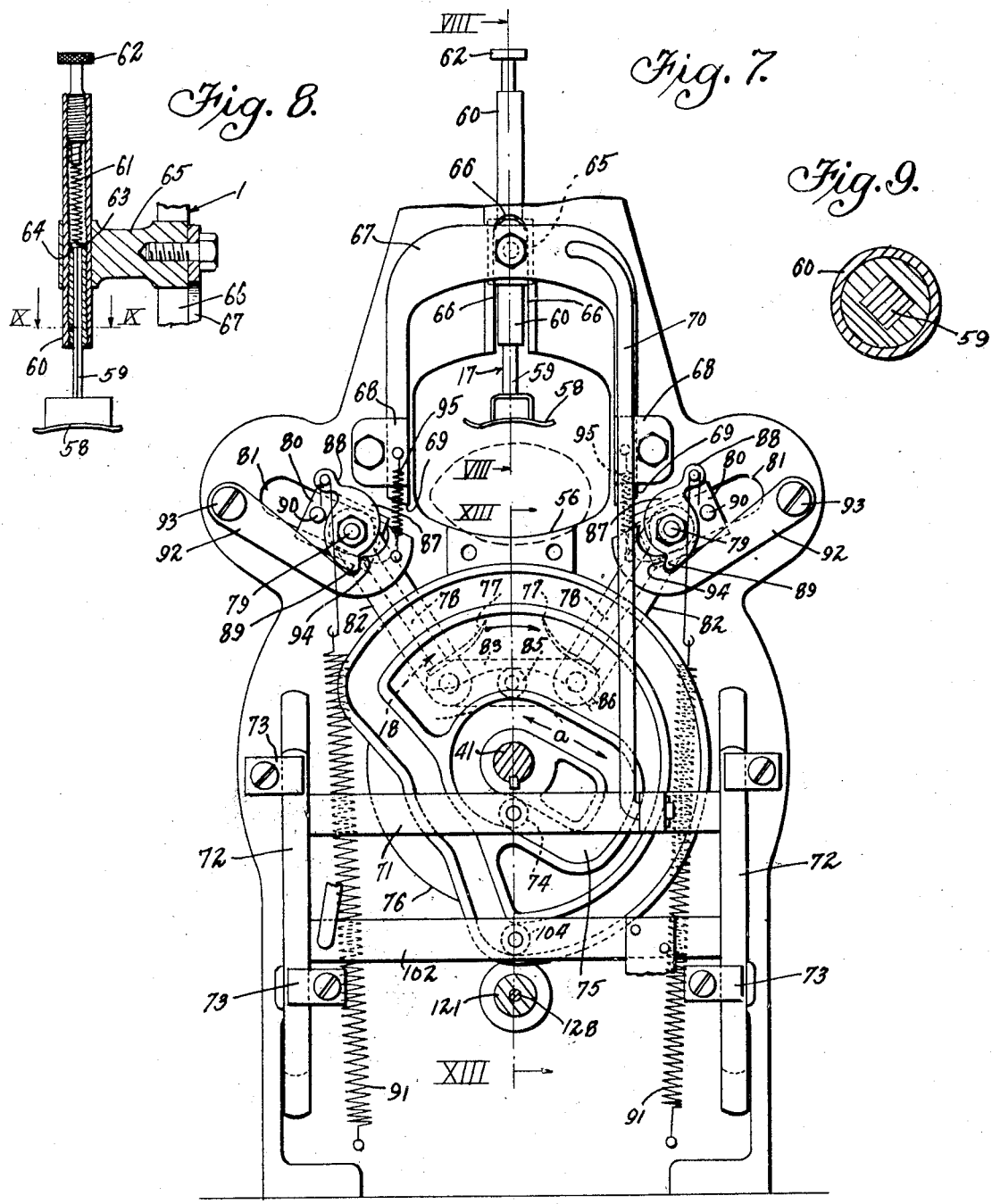

Jan. 15, 1935.  W. G. YOUNG ET AL  1,988,030
EGG BREAKING MACHINE
Filed June 24, 1932  10 Sheets-Sheet 6

Inventors
William G. Young
Morten Hansen
Joseph F. Pollon
By Lyon & Lyon
Attorney

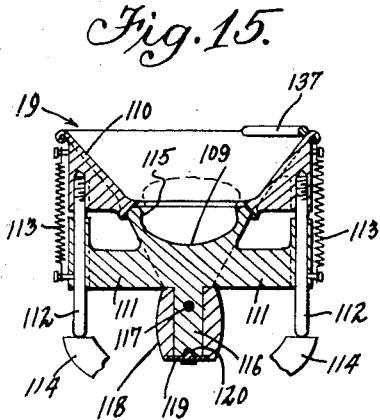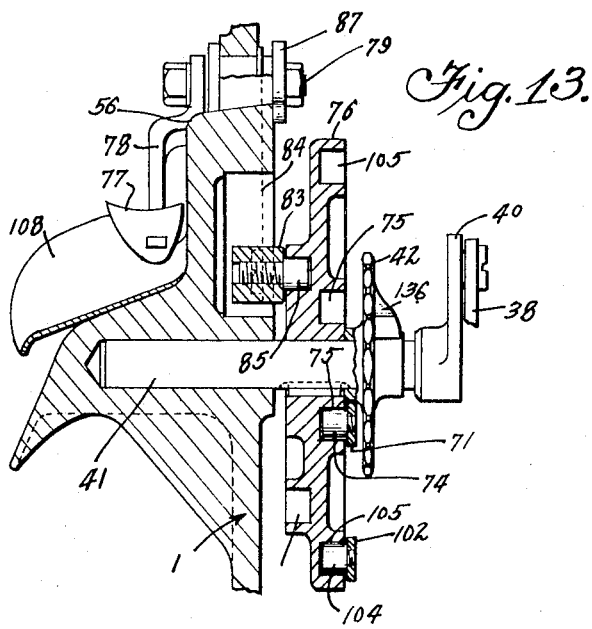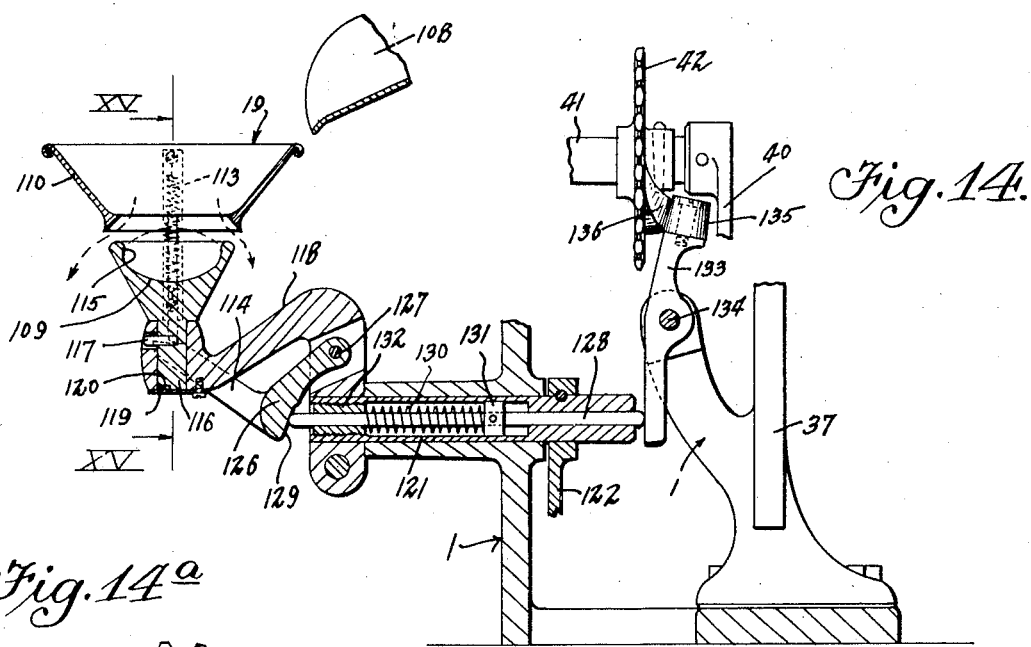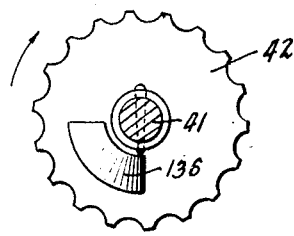

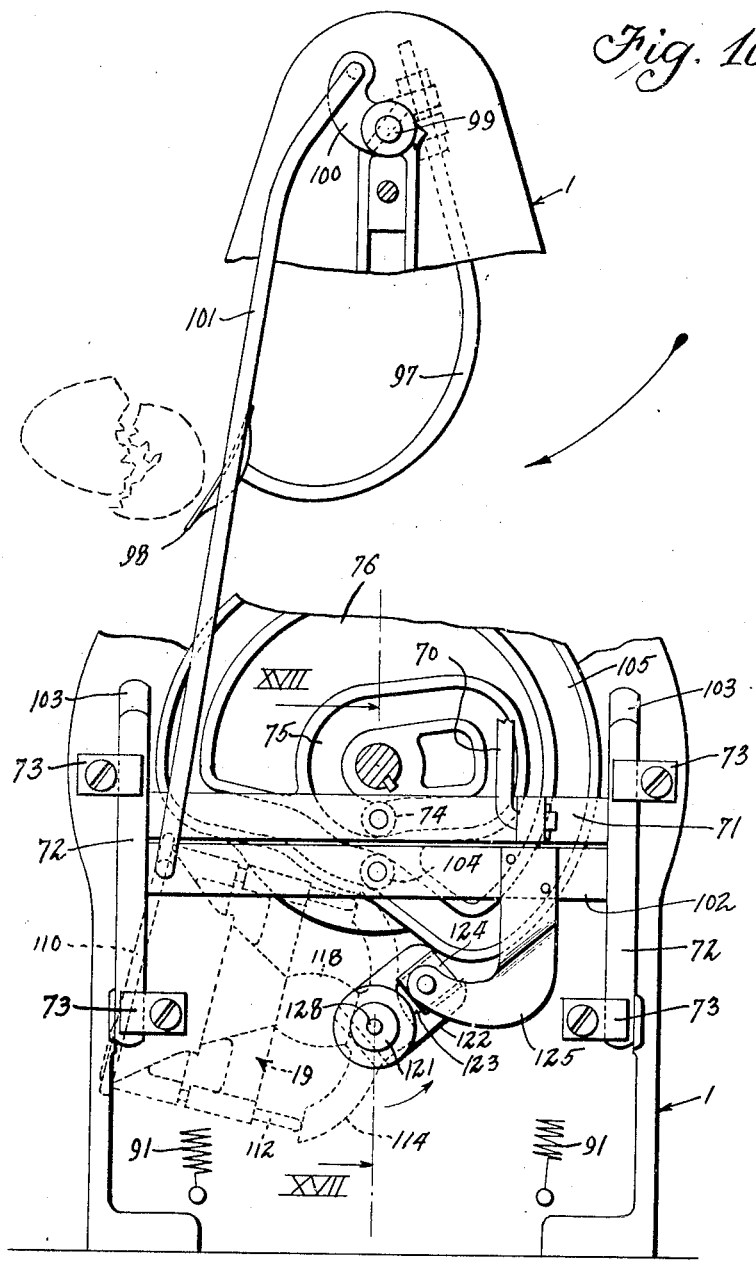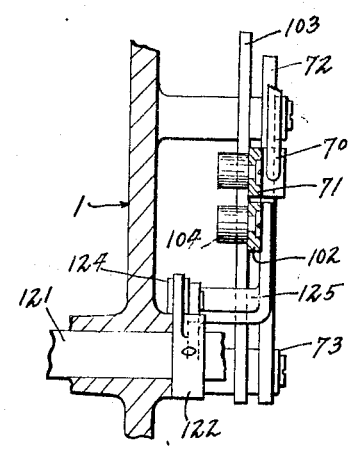

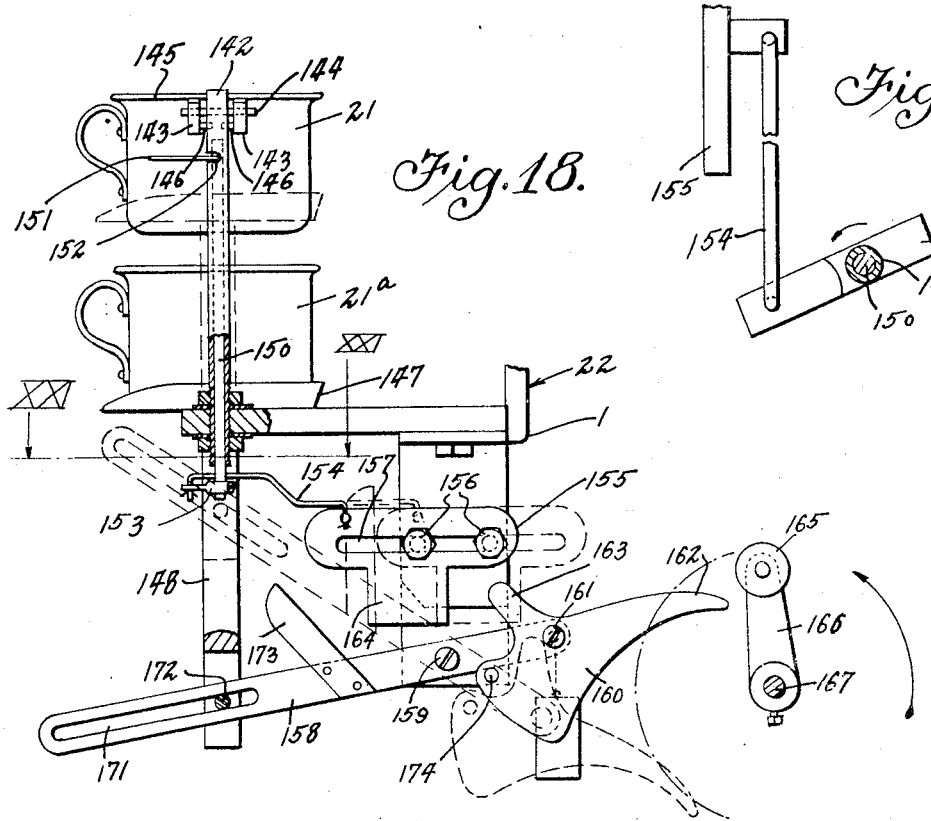
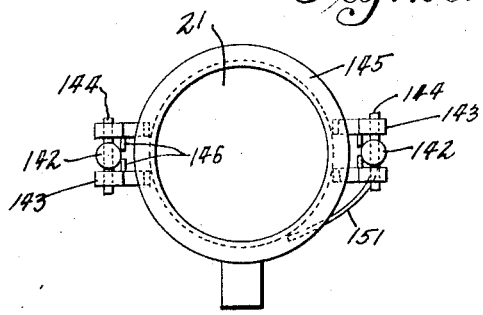
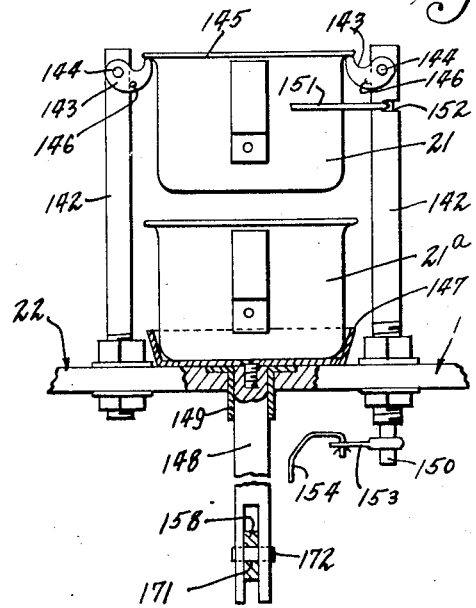

Patented Jan. 15, 1935

1,988,030

UNITED STATES PATENT OFFICE 1,988,030

EGG BREAKING MACHINE

William G. Young and Morten Hansen, Los Angeles, and Joseph F. Pollon, Glendale, Calif.; said Pollon assignor to said Young and said Hansen Application June 24, 1932, Serial No. 619,100

14 Claims. (Cl. 146—2)

This invention relates to automatic machines for breaking eggs, emptying the contents from the shell, and separating the whites from the yolks. It involves certain modifications and improvements in a machine disclosed and claimed originally in our co-pending application, Serial No. 449,240, filed May 2, 1930.

The aforementioned application discloses a machine comprising means for feeding eggs to a rack in a predetermined position, means for breaking the eggs on the rack and opening up the shell to permit the contents to drain therefrom, means for removing the empty egg shell from the rack, and means for separating the whites from the yolks, all of these means being caused to function in proper timed relation for complete automatic operation.

A general object of the present invention is to improve the certainty of operation and the efficiency of the automatic egg breaking machine of the type disclosed in the aforementioned application, and to simplify the mechanism of the machine.

A specific object is to improve the egg feeding mechanism whereby the eggs are delivered with greater certainty to the breaking rack in proper position for most efficient cracking and opening of the shell.

Another specific object is to increase the speed and completeness of the separation of the egg contents from the shell without rupturing the yolks of the eggs.

Another specific object is to more completely separate the whites from the yolks and thus yield drier yolks.

Still another specific object is to provide a device for automatically placing cups in position to receive the separated whites and yolks of the eggs.

Other objects and features of the invention will be apparent from the following detailed description when read in connection with the accompanying drawings, in which—

Figure 7 is a fragmental elevation rear view of the machine showing the cam mechanism for operating the egg holding and cracking means;

Figure 8 is a detail elevation sectional view in the plane VIII—VIII of Figure 7 showing the plunger for holding eggs upon the breaking rack;

Figure 9 is a detail sectional view in the horizontal plane IX—IX of Figure 8;

Figure 13 is a detail sectional elevational view in the plane XIII—XIII of Figure 7 showing the shape and position of the cam;

Figure 14 is a fragmental side elevation sectional view of the mechanism for separating the white and yolk of an egg;

Figure 14a is a face view of the cam 136 in Figure 14;

Figure 15 is a detail elevation sectional view of the yolk separating cup in the plane XV—XV of Figure 14;

Figure 16 is a fragmental rear elevation view of the machine showing the egg shell ejecting means and the cup tilting means;

Figure 17 is a detail sectional elevation view in the plane XVII—XVII of Figure 16;

Figure 18 is a side elevation view partly in section of the cup moving mechanism for placing cups in position to receive egg contents;

Figure 19 is a fragmental front elevation view of a portion of the cup lifting and holding mechanism;

Figure 20 is a plan view of the cup supporting mechanism shown in elevation in Figure 19;

Figure 21 is a horizontal detail view in the plane XXI—XXI of Figure 18 showing the arrangement of connecting links.

A machine in accordance with the present invention comprises in general a bin or tray for receiving and holding a supply of eggs in bulk, a feeding device for removing eggs, one at a time, from the bulk supply in the bin and delivering them in a predetermined position upon a breaking rack, a device for holding the eggs firmly on the breaking rack while the shell of the egg is cracked on the under side and the two half shells separated to permit the contents to drain away, a receptacle for receiving the contents of each egg and separating the white from the yolk and delivering the whites and yolks to separate containers, and a device for ejecting the empty shell of the egg from the breaking rack to permit the succeeding egg to be fed to the rack and broken.

Figure 2:
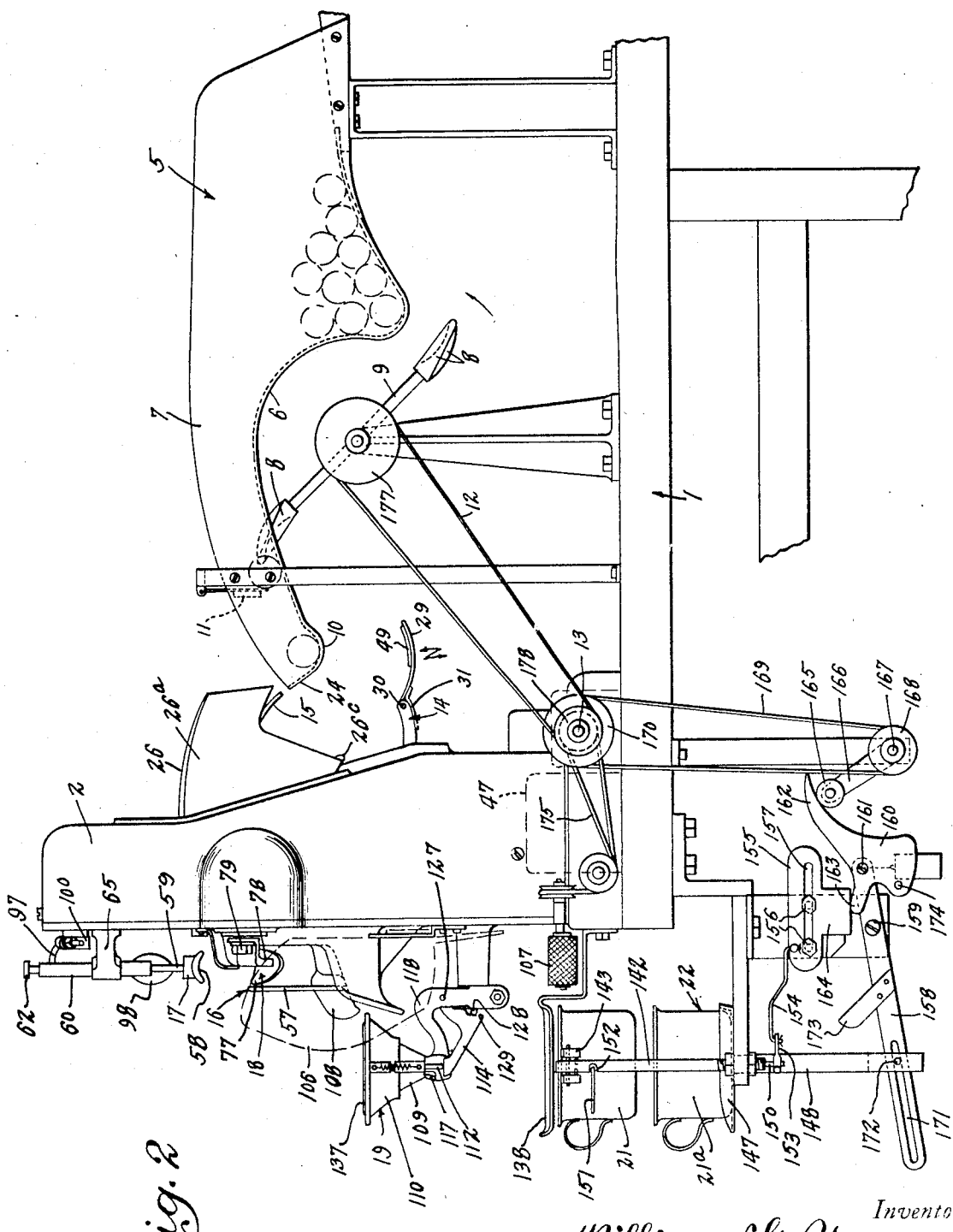
Figure 2 is a side elevation view of the entire machine.

Referring to Figure 2, a bin 5 is shown for holding a bulk supply of eggs to be broken. Bin 5 may extend to any desired distance to the right and as eggs are removed from it by the mechanism to be described, they may be replaced with new eggs supplied from the extended portion to the right (not shown). At its discharge end, bin 5 is provided with an inwardly convex, arcuate end wall 6 which is relatively narrow, being substantially of a width slightly in excess of the length of the largest eggs to be handled. Side walls 7 converge to the arcuate end wall 6 to guide the eggs as they are rolled thereover. The end wall 6 itself is composed of a plurality of spaced apart members (Figure 5), providing longitudinal slots therebetween for the passage of fingers 8 mounted upon a rotating arm 9. As the arm is rotated, the fingers 8 pass through the slots in the arcuate end wall 6 of the bin, select an egg from the bulk mass of eggs in the bin, and roll it up along wall 6 out of bin 5, after which the egg rolls along the slightly inclined continuation of wall 6 to a nest 10 formed by extending upwardly the spaced apart bars of the extended wall 6. The egg feeding structure comprising bin 5 and the fingers 8 on a rotating arm 9 is described and claimed specifically in the co-pending application of Morton Hansen, Serial No. 581,884, filed December 18, 1931.

To prevent the eggs rolling too fast along the inclined runway leading to nest 10, a pendulum 11 may be inserted in the path of the eggs to retard their movement. The rotating arm 9 is driven by a belt 12 at a constant rate of speed from a constantly rotating shaft 13 so that it periodically carries an egg out of the bin 5 and deposits it in the nest 10.

From the nest 10, eggs are lifted by a reciprocating arm designated generally at 14 and carried up over a track 15 and delivered to an egg breaking rack 16.

Figure 1:
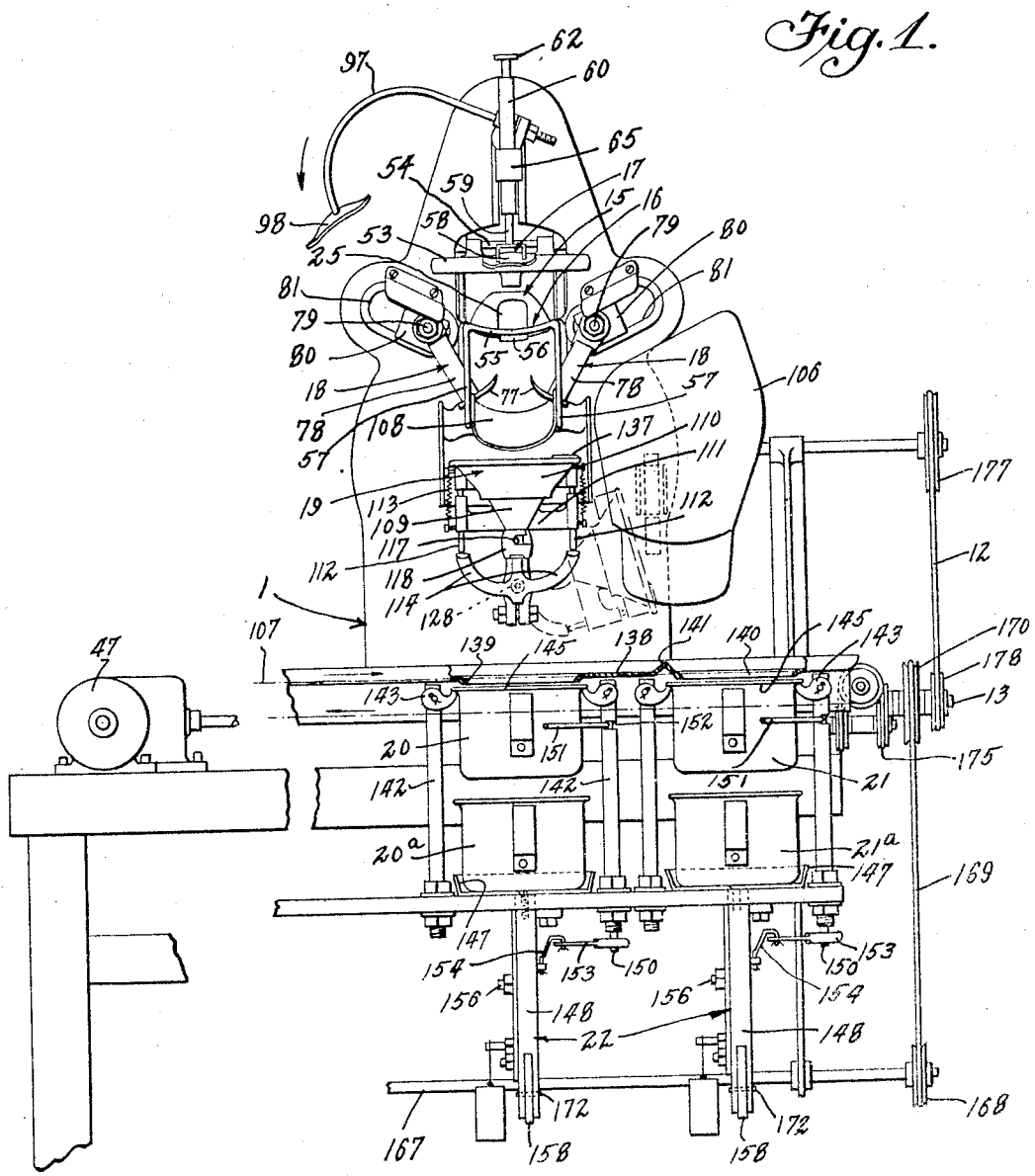
Figure 1 is a front elevation view of the entire machine.

Referring now to Figure 1, each egg, after being delivered to the rack 16, is held securely thereon by a descending clamping member 17 while it is cracked on the under side by a knife mechanism designated generally at 18. Knife mechanism 18, after cracking the egg shell approximately at its great circle (by great circle is meant the largest circle definable by a plane cutting the egg perpendicular to its axis), separates the two halves of the egg shell at the bottom, and permits the contents (the white and the yolk) to fall into a white and yolk separating mechanism designated generally at 19. After receiving the white and yolk of an egg, the separating mechanism 19 discharges the white into a cup 20 and then tilts to discharge the yolk into a yolk receiving cup 21. The operation briefly described is repeated periodically.

When the cups 20 and 21 are filled, they are removed for emptying by an operator, and a cup moving mechanism designated generally at 22 then automatically lifts auxiliary cups 20a and 21a into the position formerly occupied by cups 20 and 21.

It will be observed from the foregoing brief description that our machine comprises as essential elements (1) an egg feeding mechanism (2) an egg holding, breaking and shell-ejecting mechanism (3) a white and yolk separating device, and (4) a cup moving mechanism, all operated in timed relation with each other. A complete explanation of the operation of the machine will now be given by reciting in detail the operation of each of these different parts of the machine.

*The egg feeding mechanism*

As previously outlined with reference to Figure 2, eggs, after being deposited in the nest 10 from the bin 5, are carried up over a track 15 by an arm mechanism 14 to the egg breaking rack 16.

Figure 3:
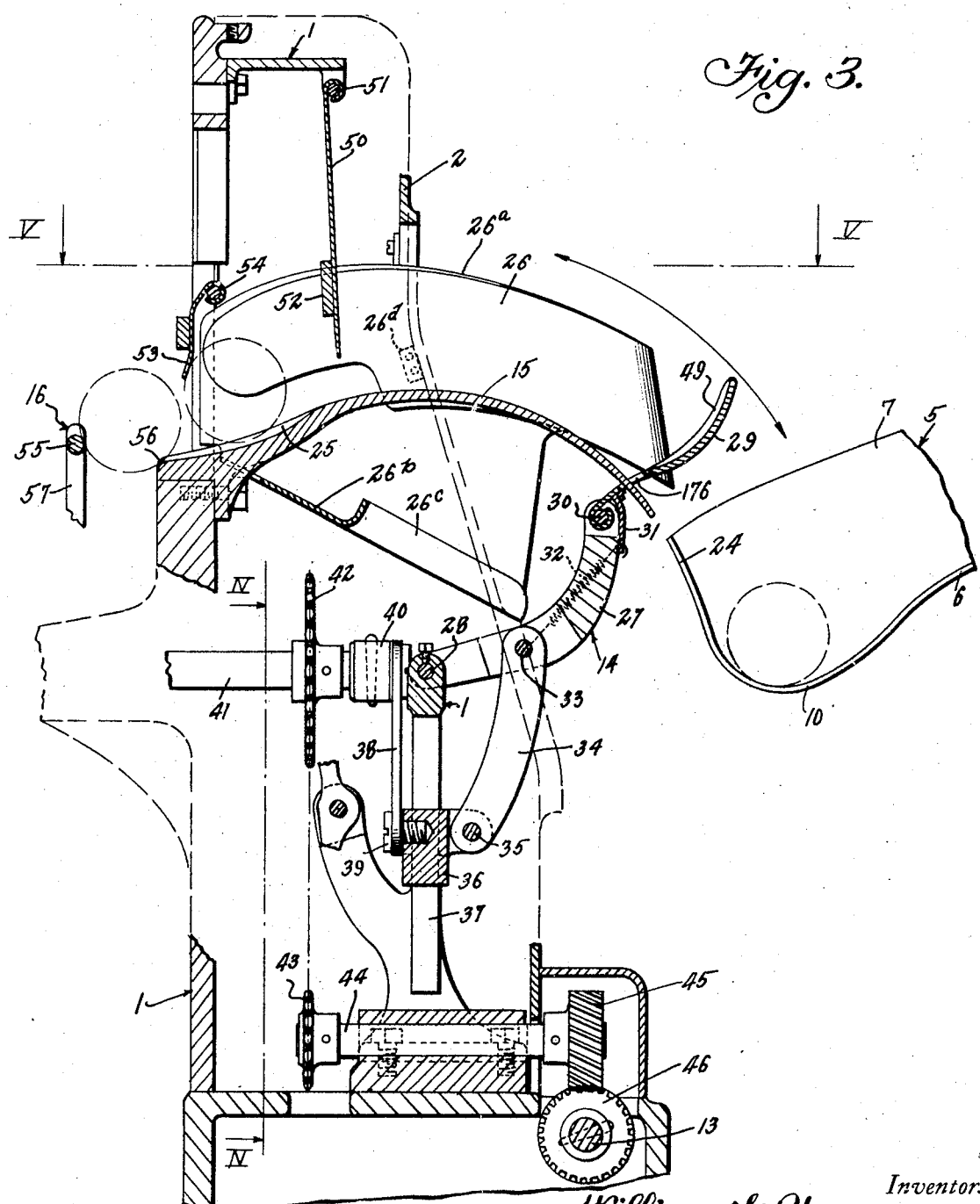
Figure 3 is a side elevation view partly in section showing in detail a portion of the egg feeding mechanism.
Figure 6:
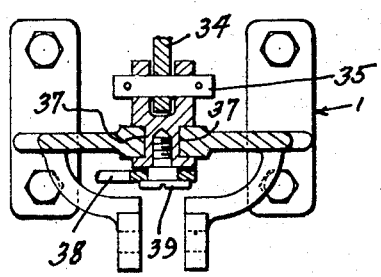
Figure 6 is a detail sectional view taken in the horizontal plane VI—VI of Figure 4.
Figure 4:
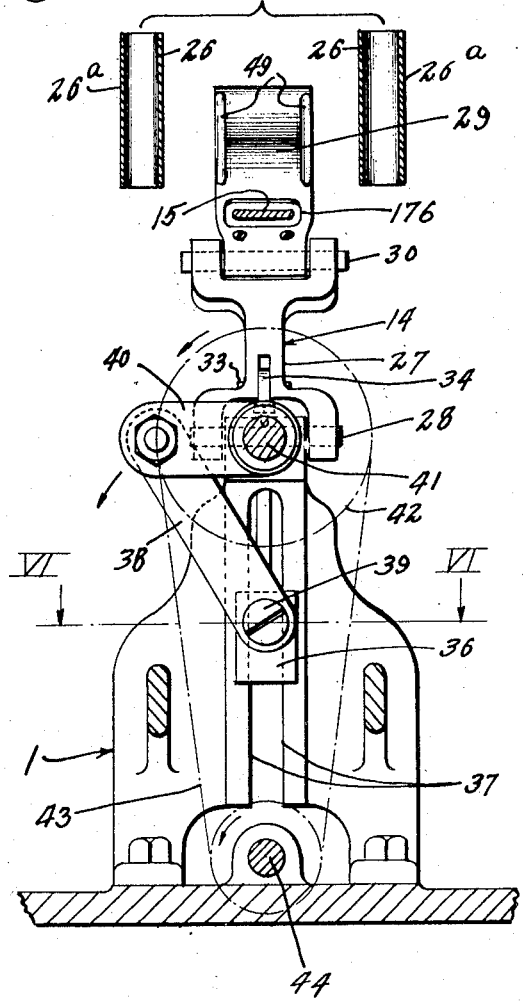
Figure 4 is a detail front elevation sectional view in the plane IV—IV of Figure 3.
Figure 5:
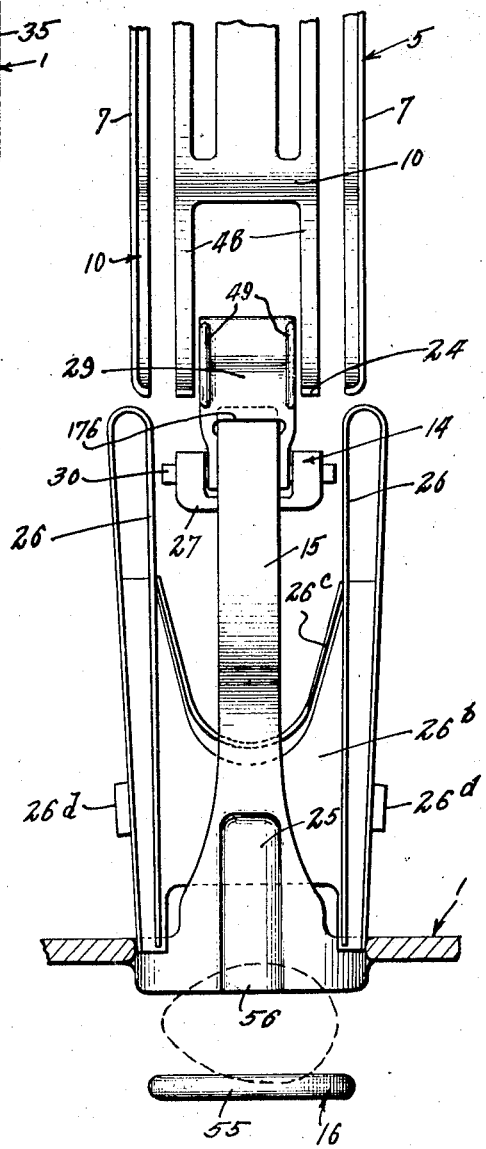
Figure 5 is a horizontal fragmental view in the plane V—V of Figure 3 showing the egg track and side guards therefor.

Referring now to Figure 3, which shows the machine partly in section with the outer cover removed, the track 15 comprises a tongue attached at its forward end to the frame 1. Throughout most of its length tongue 15 is bent approximately in the arc of a circle so that its rear end is substantially in line with, although spaced slightly from, the upwardly extended end 24 of the bottom wall of the nest 10, the outer end of tongue 15 sloping downwardly as shown, and the forward end also sloping down toward the rack 16. The upper surface of tongue 15 is substantially flat laterally throughout the greater part of its length as shown in Figures 4 and 5, but is hollowed out at its forward end as shown at 25 for a purpose to be described later.

Side guards 26 composed of flexible sheet metal elements extend backwardly away from the frame 1 to a point adjacent the outer end of the tongue 15. Guards 26 are bent back on themselves at their rear ends and continued forwardly as members 26a. At their lower edges members 26a are joined by a bottom section 26b which serves as a trough to prevent the contents of a broken or leaking egg on track 15 from falling into the mechanism of the machine therebelow. To this end the bottom section 26b is provided with an upturned flange 26c forming a pair of channels extending rearwardly on either side of an opening therebetween for passage of the arm assembly 14. Lugs 26d are provided on the outer surface of members 26a, which lugs engage with the rear cover 2 (Figure 2) of the machine for supporting the guard structure.

The guards 26 are spaced a distance apart equal to or slightly greater than the length of the largest eggs to be rolled along tongue 15, but are spaced sufficiently close to the edges of tongue 15 to prevent an egg dropping off the tongue should it become turned from its normal crosswise position while being rolled along the tongue. It is essential that side guards 26 be flexible to prevent possible breakage of an egg by jamming between the guard and the tongue.

The arm assembly 14 for carrying eggs from the nest 10 up and over the tongue 15 comprises a lever 27 pivoted at one end to the frame 1 by a hinge pin 28 and carrying on its opposite end a spoon 29, the latter being hinged to the end of lever 27 by a pin 30. Spoon 29 is provided with a projecting stop member 31 which normally rests against the lower side of lever 27 as shown in Figure 3, and limits clockwise rotation of the spoon 29 with respect to lever 27. A spring 32 extending from the end of the stop member 31 to a point further down on lever 27 normally maintains the spoon in the position shown in Figure 3 but permits it to rotate in a counterclockwise direction, thereby permitting the spoon to fold back and pass an egg in nest 10 as it moves downward therepast. The spoon 29 is provided with an opening 176 for the track 15 as it moves back and forth therealong.

To reciprocate the arm assembly 14 from a position below nest 10 to a position adjacent the forward end of track 15, the lever 27 is pivotally connected by a pivot 33 to the upper end of a link 34, and the lower end of link 34 is pivotally connected by a pivot 35 to a crosshead 36 which is vertically reciprocal within stationary guides 37 forming a part of the frame 1 of the machine. In operation, the crosshead 36 is constantly reciprocated by a connecting rod 38 which is pivotally connected at its lower end by a pivot 39 to the crosshead 36 and is pivotally connected at its upper end to the outer end of a crank 40 secured to a shaft 41 (Figure 4). Shaft 41 is driven by a sprocket wheel 42 which is coupled by a chain to a sprocket wheel 43, the latter being driven through a shaft 44, and helical gears 45 and 46 from shaft 13. Shaft 13 in turn is constantly driven by a motor 47 (Figure 1).

The mechanism described oscillates the lever 27 through an arc about pivot 28 to reciprocate the spoon 29 from a position below nest 10 to an upper position adjacent the forward end of track 15. On its downward movement spoon 29 is deflected in a counterclockwise direction about pivot 30 to pass an egg in nest 10 but is restored to normal position by the spring 32 after passing the egg; thereafter, on its subsequent upward movement, the spoon 29 picks the egg out of the nest 10 and rolls it up along the track 15. As shown clearly in Figure 5, the bottom of the nest 10 comprises two spaced fingers 48 which are sufficiently close together to prevent an egg falling therebetween, but permit the passage of the spoon 29.

It is essential in the proper operation of our machine that eggs be delivered to the breaking rack 16 with their axes crosswise relative to the track 15. It has been found that by shaping the spoon 29 to contact with the eggs at two spaced apart points, instead of at the middle, the spoon will roll eggs smoothly up the track 15 and maintain them in crosswise position, the eggs rolling with substantially no slippage along track 15 but slipping constantly with respect to the spoon 29. Spoon 29 is therefore provided with forwardly projecting ribs 49 adjacent its sides and during normal operation these ribs 49 contact with the egg but the portion of the spoon therebetween does not contact with the egg. However, should an egg be deposited in the nest 10 with its axis of symmetry lying in some direction other than crosswise, then the central portion of spoon 29 may contact with an end of the egg. It has been found, however, that with a spoon shaped as described, such an egg is usually turned during its passage up over the track 15 so that it is delivered at the inner end of the track in desired crosswise position. It has been found that the laterally flat upper face of track 15 is conducive to this crosswise orientation of the eggs, and that such a flat tongue functions more efficiently in this respect than where a double track is provided for the egg to roll upon.

To prevent eggs from running away from the spoon 29 as they are carried to the uppermost part of the curved track 15, a stop is provided in the form of a pendulum 50, pivotally suspended by a hinge pin 51 from the frame 1 of the machine. Pendulum 50 is provided with a relatively heavy bob in the form of a transverse member 52 near its lower end to give sufficient restoring force to restrain eggs from rolling therepast by virtue of their own weight. To further restrain eggs from rolling freely from the track 15 onto the breaking rack 16 after they pass pendulum 50, a gate is provided above the forward end of track 15, which gate comprises a second pendulum 53 also pivotally supported at its upper end by a pivot 54 to the frame 1 of the machine.

In operation, spoon 29 rolls an egg from the nest 10 up over the track 15 past the pendulum 50 and leaves it resting against the pendulum 53, the egg being unable by virtue of its weight to pass the pendulum 53. Thereafter, on the next stroke, the spoon 29 rolls a second egg from nest 10 up over track 15 past pendulum 50 and against the first egg, thereby forcing the latter under the pendulum 53 and onto the breaking rack 16; the second egg in turn is restrained from moving onto the rack 16 by pendulum 53, until the next reciprocation of spoon 29.

Although it has been found that for most efficient orientation of an egg while it is being rolled by the spoon 29 the upper surface of track 15 should be laterally flat, it has been found that during its passage from a position between pendulums 50 and 53 to rack 16, the egg is less apt to twist and be delivered to the rack in wrong position if it rests on the track at two points. It is for this reason that the forward end of tongue 15 is hollowed out at 25 as previously described. The egg then rests upon the edges of the hollow 25, the center of the track being sufficiently low to clear the middle of the egg.

*The egg holding and breaking mechanism*

Referring now to Figures 3 and 5, the rack 16 for supporting the eggs during the breaking process comprises the forward end of the tongue 15 and a bar 55 positioned in front of the end of tongue 15 a distance slightly less than the width of the smallest eggs to be broken. The forward end of tongue 15 is widened out as shown in Figure 5, and is curved to form an upwardly concave edge 56 as shown in Figure 7. The bar 55 is substantially flat on its upper edge and is positioned slightly higher than the edge 56 to prevent any possibility of eggs rolling thereover as they pass from the tongue 15 onto the rack. The cross bar 55 is supported by a pair of legs 57 which are formed integrally therewith and extend down below the bar 55 a short distance and then extend inwardly and are secured to the frame 1 of the machine as shown in Figure 1.

An egg is broken on the rack 16 by knives striking the under side of the shell, and it is therefore necessary to provide a clamping means for holding the egg firmly down upon the rack while it is being cracked. This clamping means, which is designated generally by the numeral 17, comprises a face plate 58 (Figures 7 and 8) that is roughly concave on its lower surface to conform to the shape of an egg, and is secured to the lower end of a square plunger 59 supported for vertical movement in a guide member 60. Guide member 60 is provided with an enlarged circular bore at its upper end in which is positioned a spiral spring 61 which is maintained in compression against the upper end of the square plunger 59 by an adjusting screw 62 threaded into the upper end of guide 60. The square plunger 59 is provided with a head 63 on its upper end which engages with a shoulder 64 formed by the upper end of the squared portion of the guide 60. Head 63 and shoulder 64 prevent the plunger 59 from dropping below a predetermined point, and the spring 61 resiliently forces the plunger into this normal position except when the face plate 58 is in contact with an egg. The guide 60 is rigidly secured to a crosshead 65 which is slidably mounted for vertical movement in guideways 66 in the frame 1. Secured to the crosshead 65 on the rear side of the frame 1 is a plate 67 shaped in the form of an inverted U, the arms of which slide vertically in guideways 68 secured to the frame 1. The lower ends 69 of the arms cooperate with the knife mechanism to be described later.

In the operation of the machine, the plate 67 and crosshead 65 are reciprocated vertically to move the clamping face 58 down against an egg to hold it firmly on the rack 16 during the cracking of the shell, and to lift the face 58 clear of the shell at other times. The mechanism for reciprocating the crosshead 65 comprises a link 70 pivotally secured at its lower end to a crosshead 71. Crosshead 71 is rigidly attached at its outer ends to vertical bars 72 which are slidably mounted for free vertical movement on the frame 1; thus bars 72 are supported between guide faces on the frame 1 and outer removable guide pieces 73 which are attached to the frame by screws as shown (Figure 7). Crosshead 71 carries at its center a pivotally mounted roller 74 which engages with a cam track 75 on a cam plate 76 mounted on and keyed to the shaft 41, which was previously referred to in connection with the mechanism for operating the egg feeding spoon 29 (Figure 3). The general outline of the cam plate 76 and its position on shaft 41 is clearly shown in the cross-sectional view of Figure 13. It will be observed that shaft 41 is rotatably journaled in the frame 1.

Shaft 41 is constantly rotated by sprocket wheel 42, as previously described, and the rotation of the cam plate 76 periodically raises and lowers the crosshead 71 and, through link 70, the plate 67 and the crosshead 65 to which the plunger 59 is attached. An egg, while held firmly upon rack 16 by the clamping mechanism 17, is cracked and opened by a knife mechanism which will now be described.

Figure 10:
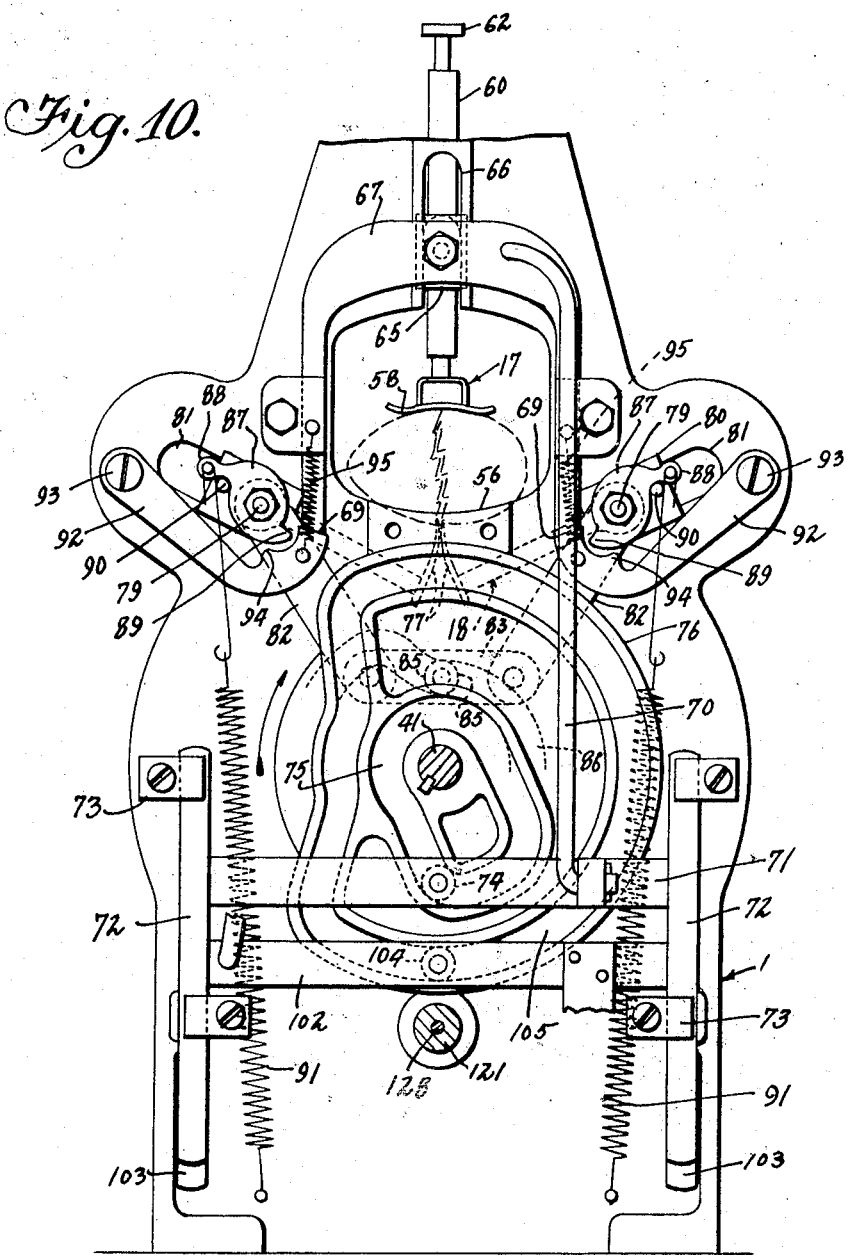
Figure 10 is a fragmental rear elevation view similar to that of Figure 7 showing the mechanism in a different phase of its operation.
Figure 12:
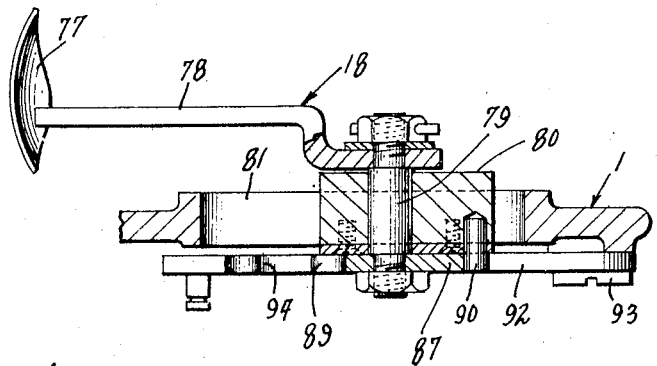
Figure 12 is a sectional detail view in the plane XII—XII of Figure 11, showing the construction of a portion of the knife operating mechanism.

Referring to Figure 1, the knife mechanism 18 comprises two knives 77 rigidly secured to the ends of arms 78 which are secured at their opposite ends (Figure 12) to pins 79 rotatably mounted in crossheads 80. Each crosshead 80 is slidably mounted for linear movement within a guideway 81 in the frame 1, these guideways extending upwardly and outwardly as shown in Figure 1. The guideways 81 are so positioned relative to each other and to the length of the arms 78 that, when the latter are rotated upwardly, the edges of the knives 77 move toward each other and strike an egg supported on the rack 16 and break its shell substantially on the great circle of the egg, as shown in Figure 10.

To actuate the knives 77, provision is made for independently moving the crossheads 80 and simultaneously rotating the pins 79 to which the knife arms 78 are attached.

To move the crossheads 80, they are connected by links 82 to a crosshead 83 which is mounted for vertical movement in a guideway 84 in the frame 1 and carries a pivotally mounted roller 85 (Fig. 11) which engages with a cam track 86 in the cam plate 76. Links 82 are pivotally connected at their ends to the crossheads 80 and the crosshead 83 respectively, so that as crosshead 83 is reciprocated vertically in guideway 84 by the engagement of the roller 85 with the cam track 86 on the rotating cam plate 76, the crossheads 80 are reciprocated in their guideways 81.

To rotate the pins 79 the following mechanism is provided: Rigidly secured to each pin 79 on the rear side of crosshead 80 is a cam plate 87 provided with an arm 88 extending upwardly and outwardly, and a shoulder 89 on the opposite end. A pin 90 mounted upon each crosshead 80 contacts with arm 88 and limits counterclockwise rotation of the cam plate 87; the cam plates are normally maintained against pins 90 by means of spiral springs 91, the lower ends of which, (Figure 10) are secured to the frame 1. When arms 88 rest against pins 90, the knives 77 are in their uppermost positions; in other words, in position to penetrate and crack the shell of an egg. To retract the knives into lowermost position preliminary to cracking an egg, a pair of lever arms 92 are pivoted to the frame 1 by pivots 93. Each lever arm 92 is provided on its upper surface with a projection 94 adapted to engage with the projecting shoulder 89 on cam plate 87 and has its inner end extended to a position in line with the lower end 69 of one of the arms of the inverted U-plate 67 associated with the egg-holding mechanism. Each lever arm 92 is normally held upward in engagement with the associated cam plate 87 by a spring 95 extending to a point thereabove on frame 1.

Figure 11:
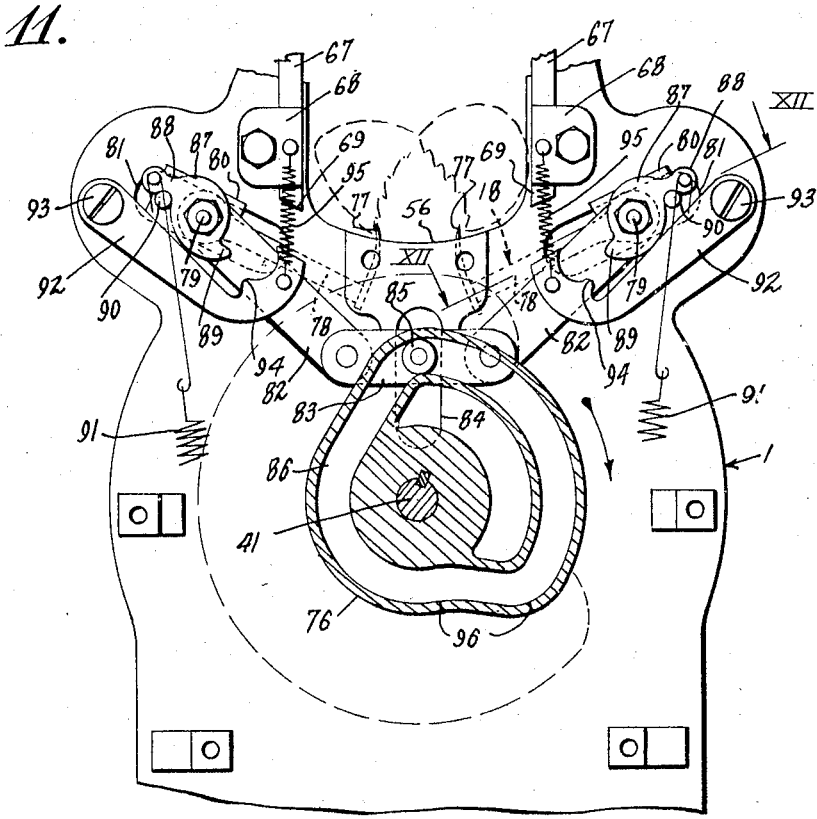
Figure 11 is a fragmental rear elevation view showing in detail the position of the egg breaking and opening mechanism in still another phase of its operation.

The egg holding and breaking mechanism functions as follows:

Referring to Figure 7, the various elements of the apparatus are shown in the positions they occupy at the time an egg is delivered from the track 15 onto the rack 16. It will be observed that crosshead 71 is in substantially its uppermost position so that the face plate 58 is in a position above the egg on the rack. At the same time, crosshead 83 is in its lowermost position so that the crossheads 80 to which the knife arms 78 are pivoted are in their innermost positions. As crossheads 80 moved into their innermost positions the projections 94 on lever arms 92 engaged with the shoulders 89 on the cam plates 87 and rotated the cam plates 87 away from pins 90 against the resistance of the springs 91. Therefore, the knives 77 are maintained in lowermost position against the tension of springs 91, the exact position of the relative parts being clearly shown in Figure 7. As the cam plate 76 continues to rotate in a clockwise direction the roller 85, which is still in engagement with the circular portion of track 86, maintains the crosshead 83 in its lowermost position, which in turn maintains the crossheads 80 in their innermost positions. During this rotation of cam plate 76, however, the roller 74 on crosshead 71 is moved downwardly by the cam track 75, thus lowering the crosshead 71, the link 70, the plate 67, and the crosshead 65, and carrying the face plate 58 down on the egg. The downward motion of the plate 67 continues until the lower ends 69 of the arms of U-shaped member 67 engage with the inner ends of the lever arms 92. Thereafter, further downward movement of plate 67 forces the lever arms 92 downward against the resistance of springs 95 until the projections 94 disengage from the shoulders 89 on cam plates 87. This permits the cam plates 87 to be quickly rotated by the springs 91 until the arms 88 engage with the stop pins 90. This rotation of the cam plates 87 rotates the pins 79 to which they are attached, and the knife arms 78, thus quickly snapping the knives 77 upward into engagement with the under side of the shell of the egg as shown in Figure 11. Stop pins 90 are so positioned relative to the arms 88 on cam plates 87 that upward movement of the knives 77 is stopped just after the egg shell is encountered. Therefore, the knives penetrate the shell and crack it evenly about its great circle but do not project into the egg far enough to break the yolk.

Cam track 75 is so shaped that downward movement of crosshead 71 ceases slightly after the lower ends 69 of the U-shaped plate 67 have forced the projections 94 past the shoulders 89 on cam plates 87 and tripped the knives (Figure 10); therefore, for a short portion of the cycle following the movement of the knives into the position shown in Figure 10 the plate 67 and crosshead 65 remain stationary, thus holding the face plate 58 against the top of the egg. During this time, however, the roller 85 is in engagement with the outwardly extending portion 96 (Figure 11) of track 86 so that crosshead 83 is lifted. The cam track 86 is inclined very sharply over this portion 96, so that the crosshead 83 is moved upward very quickly. Upward movement of crosshead 83 in turn moves the crossheads 80 outwardly in their guides so that the knives 77 are snapped apart into the position shown in Figure 11, thus quickly separating the two halves of the egg shell with which they are engaged. The contents of the egg thereupon fall out of the opened egg into the white and yolk separating mechanism to be described later. The shaping of the cam track 86 very steeply over the portion 96 (Figure 11) to elevate the crosshead 83, and thereby snap the crossheads 80 and the knives 76 apart quickly, is highly important, as the resultant sudden opening of the shell tends to tear the shell away from the egg contents whereby they leave the shell more quickly.

During the portion of the cycle following the separation of the knives 77, roller 85 on crosshead 83 engages with the substantially circular portion of the cam track 86, thus maintaining the knives 77 in separated position for a time. Thereafter the cam roller 85 engages with the inwardly sloping portion of the cam track 86, which lowers the roller 85 and crosshead 83 and moves the crossheads 80 inwardly in their guideways 81. This moves the knives 77 toward each other so that they release the edges of the half shells and leave the half shells lying loosely upon the rack 16. By virtue of the fact that the front bar 55 (Figure 3) of the rack 16 is substantially flat, there is little or no tendency for the halves of the egg shell to close together. They are therefore left in open position on the rack out of contact with the edges of the knife plate 77 so that the last remaining portion of the white can drain freely from the shell. During this time, however, the roller 74 is moved upward by the straight portion 75a (Figure 7) of its associated cam track 75, thus raising the plate 67 and the face plate 58 away from the egg shell and releasing the lever arms 92 so that they are rotated upward by springs 95 into engagement with the cam plates 87. The raising of the face plate 58 releases the egg shell so that it lies loosely on the rack 16. The halves of the egg shell still remain joined together at their uppermost points by the lining membrane of the shell, which was never ruptured at this point. The empty shell is then ejected from the rack by the following mechanism:

Referring to Figure 1, an ejector arm 97, having a plate 98 on one end, is attached at its other end to a shaft 99 (Figure 16) which is journaled in the frame 1 and extends therethrough. On the rear end of shaft 99 and on the rear side of the frame 1 a crank arm 100 is rigidly secured, and to the outer end of crank 100 there is pivoted a link 101 which extends downwardly and is pivoted at its lower end to a crosshead 102, the outer ends of which are rigidly secured to vertical bars 103 slidably mounted for vertical movement in guideways in the frame 1 immediately in front of the bars 72 to which the crosshead 71 is attached. Crosshead 102 carries a pivotally mounted roller 104 which engages with a cam track 105 in the cam plate 76. It will be observed from Figure 13 that cam tracks 105 and 75 are cut in the rear face of cam plate 76 and that cam track 86 is cut in the forward face of plate 76. The configuration of cam track 105 (Figure 16) is such that roller 104 and crosshead 102 are maintained in lowermost position during most of the cycle of operation, thus maintaining the crank 100 in its lowermost position, in which the ejector arm 97 is maintained in its extreme upper left position as shown in Figure 1. However, immediately following the upward movement of the clamping plate 58, the roller 104 is moved sharply upward by the nearly radially inclined section of cam track 105, thus moving the crosshead 102, the link 101 and the crank arm 100 sharply upward, thus rotating shaft 99 and the ejector arm 97 in a clockwise direction (referring to Figure 16) so that the ejector plate 98 is swept through an arc immediately above the rack 16, thus kicking the emptied egg shell off the rack and into a funnel 106 (Figure 1) through which it falls onto a traveling belt 107 (Figure 2) driven by a belt 175 from shaft 13, and is carried away to any desired dumping point. Immediately upon completing its upward movement as described, the crosshead 102 (Figure 16) is lowered again to its normal position by engagement of roller 104 with the outwardly extending portion of cam track 105, thus oscillating the ejector arm 97 back to its normal position, as shown in Figure 1, where it remains until the succeeding egg has been broken and the contents of the shell removed.

The description of the operation of the knives 77 was stopped in that portion of the cycle at which the crossheads 80 had been moved a short distance inwardly from their outermost positions to release the egg shell. Continued inward movement of the crossheads 80 (Figure 11) brings the shoulders 89 on the cam plates 87 into contact with the projections 94 on the lever arms 92, the latter being maintained in contact with the cam plates 87 by springs 95. Thereafter, further inward movement of the crossheads 80 forces the cam plates 87 to rotate with pins 79, thus rotating the knife arms 78 downwardly until they reach the initial position shown in Figure 7. Thereafter, downward movement of plate 67, as previously described, forces the lower ends 69 of plate 67 against the free ends of the lever arms 92 and trips the knives to crack the succeeding egg which has been moved onto the rack 16 by the spoon 29.

The white and yolk separating device

Referring now for the moment to Figures 1, 2 and 3, as each egg is cracked and opened upon rack 16, the contents drop down between the front bar 55 and the front edge 56 of the track 15 into a trough 108 which deflects them into the white and yolk separating receptacle 19. The trough 108 (Figure 13) is preferably positioned as far as possible below the rack 16 and is inclined steeply toward the receptacle 19, thus giving as nearly as possible a free drop through a considerable distance below the rack 16. This free drop is of substantial value in facilitating the drainage of the egg contents, as the white of an egg is more or less gelatinous in consistency and tends to adhere together in a single mass; therefore, the portion of the white which initially escapes from the shell, if permitted to fall freely therefrom, tends to draw down the remaining mass of white from the shell. However, when the contents of the egg are dropped freely a substantial distance below the shell, provision must be made to prevent rupture of the yolk by impact with the trough. It has been found desirable to hollow out the trough 108 laterally as shown in Figure 1 to prevent excessive spreading of the yolk and the resultant rupture of the yolk-containing membrane. Such a hollow trough breaks the fall of the egg contents sufficiently to prevent rupture of the yolk, and slows its movement into the separating receptacle 19 sufficiently to prevent rupture therein, without actually stopping the continuous movement of the mass of white from the egg shell to the receptacle 19.

Referring for the moment to Figure 15, the separating receptacle 19 comprises a central yolk cup 109 surrounded by an upwardly and outwardly extending separable rim portion 110. The yolk cup 109 is provided with a pair of oppositely extending wings 111 in the outer ends of which are provided vertical bores for slidably receiving a pair of pins 112 secured to and projecting downward from the rim 110. The pins 112 guide the rim for free vertical movement upward relative to the cup 109. The rim 110 is normally maintained in contact with the edge of the cup 109 by springs 113. Pins 112 project through the bores in the wings 111 and extend therebelow. Means comprising lifter arms 114, to be described in detail later, impinge against the lower ends of pins 112 and lift them periodically, thus carrying the rim 110 a short distance above the yolk cup 109 to permit the white to flow out over the upper edge of cup 109 while retaining the yolk within the cup.

The yolk cup 109 is so dimensioned that it is completely filled or more than filled by the smallest yolks occurring in any of the eggs to be broken. Therefore, even with the smallest eggs the yolk substantially fills the yolk cup 109, and when the rim 110 is lifted practically all of the white drains out of the receptacle. Because of the small capacity of yolk cup 109, large yolks bulge some distance above the upper edge of cup 109. To prevent contact between the projecting portion of a large yolk and the lower edge of the rim 110, the upper edge of yolk cup 109 is provided with an inwardly extending bead 115. This bead forces the outer periphery of a large yolk inwardly as shown in the dotted line in Figure 15 so that it can not be touched and broken by the lower edge of the rim 110 as the latter moves downward on the yolk cup 109 after having been lifted to discharge the white.

Yolk cup 109 is provided at its lower end with a cylindrical base portion 116 having a pin 117 projecting therefrom forming a bayonet connection cooperating with a socket on a supporting member 118. A spring plate 119 (Figure 14), having a detent 120 thereon for engagement with a depression in the lower face of member 116, is secured to the lower edge of support 118 for preventing rotation and disengagement of the bayonet joint during operation of the machine, while permitting quick removal of the receptacle when desired. It is advantageous to provide for the quick removal of the receptacle 19 in case a bad egg has been broken so that the contaminated receptacle can be immediately removed and a clean receptacle substituted.

Member 118 (Figure 14) is rigidly secured to the forward end of a hollow shaft 121 journaled in and projecting through the frame 1, and a crank 122 is secured to the rear end of the shaft 121 on the rear side of frame 1. This crank 122 is provided with a radially extending guide slot 123 (Figure 16) in which is mounted a crosshead 124 which is pivotally connected to the lower end of a member 125, which in turn is secured at its upper end to the crosshead 102. The relative positions of the crank 122 and the crosshead 102 and the configuration of the connecting member 125 are shown in the cross sectional detail view of Figure 17. It will be observed that the crank 122 lies forwardly of the plane of movement of the crosshead 102 and that the member 125 is bent so that its lower end lines up properly with the crank arm 122.

As previously described, arms 114 are positioned below the pins 112 for lifting the rim 110 above the yolk cup 109. These arms 114 are joined together at their center as shown in Figure 1 and then extend rearwardly as a single and upwardly extending member 126 (Figure 14), the rear end of which is pivotally mounted by a pivot 127 to the arm 118, previously described. The member 126 is provided with a face substantially in line with the axis of hollow shaft 121, for engagement with a plunger pin 128 which extends completely through the hollow shaft 121 and projects therefrom at each end. The plunger 128 is normally retracted in a rearwardly direction out of engagement with face 129 on member 126 by a spiral spring 130 positioned between a shoulder 131 on pin 128 and a bushing 132 secured in the forward end of hollow shaft 121. When the plunger pin 128 is in its extreme right position, its forward end is out of engagement with the face 129, thus permitting the springs 113 (Figure 15) to retract the rim 110 into its lowermost position; at the same time, the rear end of the plunger pin 128 projects outwardly beyond the rear end of the hollow shaft 121. The rim 110 is periodically lifted clear of the yolk cup 109 to permit the white of an egg therein to drain away, by moving the pin 128 forward to rotate member 126 about pivot pin 127 and force the arms 114 against the lower end of pins 112. The mechanism for forcing the pin 128 forwardly as described, comprises a lever 133 pivoted substantially at its midpoint by a pivot 134 to the frame 1. The lower end of lever 133 is juxtaposed to the rear end of pin 128 and the upper end carries a roller 135 which cooperates with a cam 136 secured to the rear face of sprocket wheel 42.

As shown in Figure 14a, cam 136 is inclined gradually on its forward face to the point of maximum elevation but thereafter drops off sharply. The result is that, as sprocket wheel 42 rotates, the cam gradually forces the roller 135 and the upper end of lever rearwardly, thus gradually forcing the lower end of lever 133 and pin 128 forward to rotate the lever arm 126 and raise the pins 112 on the rim 110, thus gradually lifting the rim away from the yolk cup 109. However, after the highest point of cam 136 passes roller 135, the latter drops sharply back toward the face of sprocket wheel 42, thus permitting the pin 128 to move quickly into its extreme right position in which collar 131 bears against the shoulder provided in the hollow shaft 121, permitting the arms 114 to drop slightly below the ends of pins 112, thus permitting the rim 110 to snap back quickly against the upper edge of the yolk cup 109. This sharp closing movement of the rim is desirable in that it tends to cut any film of egg white extending over the rim of yolk cup 109 and permit the white to fall quickly and completely away from the yolk cup. The white, as it flows over the edge of yolk cup 109, falls away from the yolk cup into a white-receiving cup 20 positioned therebelow (Figure 1).

During the operation of the rim lifting mechanism comprising the lever 126, pin 128, lever 133, and cam 136, as described, the separating receptacle 19 was maintained in upright position as shown in full lines in Figure 1. After the rim 110 has lifted to discharge the white and has again lowered into contact with the upper rim of cup 109, the crosshead 102 (Figure 16) begins to move upwardly, thus moving the member 125 attached thereto, which is pivoted to the crosshead 124 mounted in the crank arm 122. Upward movement of the member 125 therefore rotates the crank arm 122 and shaft 121 in a clockwise direction (referring to Figure 1) thus rotating the entire separating receptacle 19 into the inclined position shown in dotted lines in Figure 1. This discharges the egg yolk out of the yolk cup 109 over the rim 110 into a yolk receiving vessel 21. Immediately after completing its upward movement, crosshead 102 again moves downwardly (the mode of operation of this crosshead has been fully described in connection with the operation of the egg shell ejecting means), thus restoring the separating receptacle 19 into normal position as shown in full lines in Figure 1, in which position it is ready to receive the contents of the next egg broken on rack 16.

To render more complete the separation of the white from the yolk of each egg, an inwardly extending lip member 137 is provided upon the discharge side of the rim 110. This lip is rounded so that it cannot break the membrane enclosing the yolk as the latter slides thereover, but serves as a trap to scrape off and retain any white adhering to the yolk. Since the receptacle 19 is inclined to discharge the yolk for only an instant, the white retained by the lip 137 does not have time to drain thereover before the yolk cup and rim are restored to normal position. Thereafter this white drains to the bottom of rim 110 and discharges therefrom around the edge of the yolk cup 109 the next time the rim 110 lifts away from yolk cup 109.

*Automatic cup positioning mechanism*

It is necessary in any practical automatic egg breaking machine to provide for the disposal of rotten eggs which may occasionally and unknowingly be fed to the machine. Obviously, a single rotten egg, if delivered into a container containing a quantity of good eggs would contaminate and render worthless the entire contents. We have therefore found it desirable to discharge the whites and yolks from the separating mechanism 19 into relatively small white and yolk receiving cups 20 and 21 which may be conveniently made of pint capacity. As these cups become filled they are removed and their contents inspected and emptied by an operator. If the white receiving cup 20 contains pure, clear white, the contents are emptied into a large receptacle containing only pure egg white. On the other hand, if this cup contains a bit of yolk, as occasionally happens due to imperfect eggs, the contents are emptied into a receptacle containing both white and yolks or whole eggs. Likewise, if the yolk receiving cup 21 contains the yolks of only good eggs, these yolks are emptied into a large receptacle containing pure egg yolk. Should a rotten or musty egg be broken, then both cups 20 and 21 are emptied into a waste receptacle and thoroughly cleansed before being used again. At the same time, other parts of the machine that came in contact with the bad egg are cleaned before any additional eggs are broken. For cleaning, the machine may be stopped by turning off the motor 47 or by operating a clutch provided for that purpose (not shown) and the knives 77, trough 108, and the egg separating mechanism 19 thoroughly cleaned. To facilitate the cleaning of the separating mechanism 19, it is removed from the rest of the machine by giving it a half turn and lifting the bayonet member 116 out of the socket 118 provided therefore as previously described.

Since in normal operation the egg breaking mechanism runs continually, it is necessary that the filled cups 20 and 21, as they are removed, be replaced immediately with empty cups. To this end, auxiliary cups 20a and 21a are provided immediately under the cups 20 and 21 and the following mechanism is provided for moving and retaining these cups in desired position.

As shown in Figure 1, a tray 138 is provided a short distance below the white and yolk separating mechanism 19, this tray having apertures 139 and 140 respectively through which the whites and yolks are discharged from the separating receptacle 19. This tray 138 is provided with an upwardly extending rib 141 adjacent the edge of aperture 140 on the side toward aperture 139. This rib prevents white that may drip from the receptacle 19 from flowing through the yolk receiving aperture 140, and causes it to flow back into white receiving aperture 139.

The white and yolk receiving cups 20 and 21, respectively, are positioned below the white receiving and yolk receiving apertures 139 and 140, respectively. To support each cup, a pair of pillars 142 extend upwardly from the frame 1 to a point just below the tray 138 and are provided at their upper ends with pivoted dogs 143. As shown in Figures 19 and 20, there are two dogs 143 pivoted to each pillar 142 by pivot pin 144. The inner ends of the dogs extend inwardly to engage the rim 145 of the cup. To prevent downward rotation of the inner ends of the dogs 143, each dog is provided with a pin 146 which engages with its supporting pillar 142.

The lowermost cups 20a and 21a are positioned immediately below the upper cups 20 and 21 respectively and rest in nests 147, which normally lie upon the frame 1 but are secured to the upper ends of columns 148 (Figure 19) which pass down through bushings 149 in the frame 1. When the upper cup 20 is removed, the lower cup 20a is elevated into the position formerly occupied by the removed cup by a mechanism that can be most readily described by explaining its operation.

One of the pillars 142 associated with each cup is made hollow and contains therewithin a shaft 150 (Figure 2). Shaft 150 has secured thereto an arm 151 which extends through a slot 152 in the pillar 142 out in front of the upper cup, this arm being preferably curved as shown in Figure 20. When the upper cup is filled, the operator removes it by pulling it straight forwardly off the dogs 143. This moves the arm 151 forwardly and rotates the shaft 150. Referring now to Figure 2, the rotation of shaft 150 rotates a crank 153 secured on the lower end thereof below the end of pillar 142, and, through a link 154, shifts a lock plate 155 forwardly. This lock plate 155 is slidably mounted upon the frame 1 by means of a pair of bolts 156 which are secured to frame 1 and engage with a horizontal slot 157 in plate 155.

Pivoted to the frame 1 by a pivot 159 at a point below the lock plate 155 is a lever 158. The rear end of lever 158 carries a plate 160, which is pivoted thereto by a pivot 161. Plate 160 comprises a rearwardly projecting arm 162 and a forwardly projecting arm 163. The forwardly projecting arm 163 normally contacts with the lower edge of a projection 164 on lock plate 155, which maintains the rearwardly projecting arm 162 just out of engagement with a roller 165 pivotally mounted on the end of a crank 166 on a shaft 167. Shaft 167 is constantly driven in a counterclockwise direction through a pulley 168 and belt 169 from a pulley 170 on the driving shaft 13. The forward end of lever arm 158 contains a slot 171 which engages with a pin 172 in the lower end of the shaft 148, this lower end of shaft 148 being bifurcated as shown in Figure 19 to receive lever arm 158. A restoring arm 173 is secured to lever arm 158 for a purpose to be described.

Assuming that the mechanism is in the position shown in Figure 2, the removal of the upper cup 21 by the operator moves the arm 151 forwardly, rotating shaft 150 and crank 153 as described and shifting the lock plate 155 forwardly through link 154. The apparatus is then in the position shown in full lines in Figure 18, and it will be observed that the forward movement of the lock plate 155 has moved the lower projecting portion 164 of this plate out of engagement with the forwardly projecting arm 163 on plate 160. This permits the plate 160 to rotate in a clockwise direction about its pivot 161 so that the rearwardly projecting arm 162 is moved into the path of roller 165 mounted on the end of the constantly revolving crank 166. Therefore, on its next revolution, the roller 165 engages with the upper side of arm 162 and forces that arm down into the position shown in dotted lines in Figure 18. The clockwise rotation of the plate 160 with respect to the lever arm 158 is limited by a pin 174 which engages with the under side of lever arm 158. Therefore, when the plate 160 is carried downwardly by the revolution of roller 165, the rear end of lever arm 158 is moved downwardly with member 160 and the forward end of lever 158 is swung upwardly into the position shown in dotted lines in Figure 18. This upward movement of the forward end of the lever 158 carries the shaft 148 upwardly therewith, which lifts the tray 147 and the cup 21a upwardly past dogs 143, the inner ends of these dogs rotating upwardly to permit the rim of the cup 21a to move therepast, and thereafter falling back into their normal position to engage with the under side of the rim of the cup and support it when the shaft 148 again descends; shaft 148 descends by its own weight when the rearwardly projecting arm 162 on member 160 is released by continued movement of the revolving roller 165. When the forward end of lever arm 158 moved upwardly into its uppermost position, the projecting arm 173 engaged with the forward end of member 155 and restored the latter to its normal position as shown in Figure 2. Therefore, when the arm 162 is released by roller 165 and moves upwardly, the projection 163 on plate 160 engages with the projection 164 on member 155, causing plate 160 to rotate in a counterclockwise direction about its pivot 161 until arm 162 is clear of the path of the roller 165. Rearward movement of plate 155 also rotates the shaft 150, through the link 154 and crank 153, into normal position in which the arm 151 lies in front of the cup newly moved into upper position.

It will be apparent from the foregoing description that the removal of an upper cup by the operator immediately sets into operation a mechanism which lifts the lower cup into upper position to receive the white or yolk of eggs as the case may be. The operator after emptying the cup previously removed reinserts it in lowermost position upon nest 147 and when the upper cup is again removed, this cup will be moved into position to be filled.

Review of operation

To simplify the detailed description of our machine, various portions of the mechanism have been illustrated by fragmentary views, and their operation explained without reference to the simultaneous operation of other portions of the mechanism.

It will be observed, however, that the crank 40 for reciprocating the feeding spoon 29; the cam plate 76 for reciprocating the egg clamping plate 58; the egg breaking and opening knives 77; the shell ejecting arm 97, and for tilting the separating receptacle 19; and the sprocket wheel 42 carrying cam 136 for lifting the rim 110 of the separating mechanism; are all fixed to the common shaft 41. Therefore, during each rotation of shaft 41 all the separate mechanisms described complete a cycle of operation, and the operation of each portion of the mechanism takes place in a definitely timed relation relative to the operations of the other portions. The relative timing of the different elements depends of course upon the relative orientation of crank 40, the various cam tracks 75, 105, and 86 on cam plate 76, and the cam plate 136.

These elements are so oriented that immediately after spoon 29 has reached its extreme forward position and pushed an egg from track 15 onto the rack 16, the pressure plate 58 descends to clamp the egg upon rack 16 and the knives 77 are simultaneously retracted into lowermost position. Just as maximum pressure is exerted upon the egg by final downward movement of the crosshead 65 carrying the pressure plate 58, the lower ends of the inverted U-plate 67 attached to crosshead 65 trip the knives, which fly upward and crack the shell of the egg on rack 16. Immediately thereafter the knives are drawn apart by separating movement of crossheads 80, to open the shell of the egg, and as they complete their separating movement, the crosshead 65 begins to rise to relieve the pressure exerted on the egg by pressure plate 58. In the meantime, spoon 29 has started its backward movement along track 15 to pick up another egg.

The contents of the opened egg drain into the white and yolk separating receptacle 19 and this drainage is substantially complete by the time crosshead 65 has reached its uppermost position and carried face plate 58 entirely clear of the empty egg shell, which is thereafter left lying free on rack 16. The crossheads 80 then begin their inward movement to set the knives 77 into position to crack the next egg; at the same time the rim 110 lifts away from the yolk cup 109 to discharge the white of the previously cracked egg from the separating receptacle 19. At this point the cycle of operation is half completed and spoon 29 has been moved to its lowermost position below an egg in nest 10.

As spoon 29 begins its upward movement to carry the egg in nest 10 up over the track 15, the rim 110 of the separating receptacle 19 is lowered against the yolk cup 109, and immediately thereafter the entire separating receptacle 19 is tilted to discharge the yolk therefrom. At the same time, the egg shell ejector 98 is moved across the rack 16 to kick the empty shell into the funnel 106. The separating receptacle 19 and ejector 98 are then restored to normal positions, and reach their normal positions by the time the cycle is completed and spoon 29 has forced the next egg onto the breaking rack 16.

It should be observed (Figure 3) that an egg is always left upon track 15 just back of the pendulum 53 past which eggs are pushed onto the breaking rack 16. Thus, when the machine is first set into operation, the initial upward movement of spoon 29 carries an egg from the nest 10 and leaves it on the forward end of track 15 just back of pendulum 53. On the next upward movement of spoon 29, it carries a second egg from nest 10 into the position on the forward end of track 15 and the movement of the second egg into this position moves the first egg past the pendulum 53 onto the breaking rack. Thereafter, each new egg brought up from nest 10 by spoon 29 forces the preceding egg past pendulum 53, then remains against the pendulum 53 until the succeeding egg displaces it.

As previously described, the fingers 8 (Figure 2) on the rotating arm 9 supply eggs, one at a time from the bin 5, holding a bulk supply, to the nest 10, and arm 9 is rotated through a pulley 177 and a belt 12 from a pulley 178 on shaft 13 of the breaking machine proper. The relative dimensions of pulleys 178 and 177 are so proportioned that the pulley 177 and arm 9 complete half a revolution while the arm 14 completes a cycle. Since the arm 9 is provided with fingers 8 on each end and thereby feeds an egg to nest 10 on each half revolution, it delivers one egg, and only one egg, to nest 10 during each cycle of operation of the spoon 29 on arm 14.

*Novel features of present machine*

As stated in the introduction, the machine of the present invention is an improvement of the machine disclosed in our co-pending application, Serial No. 449,240, filed May 2, 1930. The novel features of the present machine comprise:

1. The provision of feeding means ahead of the breaking machine proper for separating eggs one at a time from a bulk supply, and delivering them one at a time to the feeding spoon 29 of the breaking machine. It has been found that eggs are delivered to the breaking rack in desired crosswise position with greater certainty with this arrangement than where spoon 29 itself has to select an egg from a bulk supply as disclosed in the prior application.

2. The provision of flexible side walls on either side of the track 15 for preventing an egg falling off the track should it become turned lengthwise instead of crosswise upon the track. To be effective, these side guards must be spaced sufficiently close to the edges of the track 15 to prevent an egg falling therebetween; at the same time, they must be flexible to prevent possible jamming and breaking of an egg should it roll off the track and be forced point foremost between the edge of the track and the guard, by spoon 29.

3. A spoon having a pair of laterally spaced apart vertical ribs or ridges for contacting an egg at two points, in combination with a track having its upper surface substantially flat laterally. Because of their irregular shape, it is difficult to slide or roll an egg while maintaining its axis in a desired crosswise position. It has been discovered as a result of lengthy experimentation that a laterally flat track for the egg to roll upon, and a pusher spoon contacting with the egg at two laterally spaced points is most effective in maintaining an egg in crosswise position or in restoring it to crosswise position should it be twisted before or during its passage over the track.

4. Pendulum stops for limiting forward movement of eggs on track 15 toward the breaking rack 16. In the original machine, spring-controlled stops were employed for this purpose, but it has been found that pendulums employing no springs are not only simple, but more effective in operation than the spring-controlled devices.

5. The shaping of the forward end of track 15 to provide a double railed track for the egg during its movement from a position immediately back of the pendulum 53 onto the breaking rack 16. Although, as previously stated, it is found most desirable to employ a laterally flat upper surface on track 15 throughout the major portion of its length, it has been found that eggs are delivered in crosswise position to the rack 16 with greater certainty if they contact with the track at two laterally spaced apart points during the final short movement over the track. This feature is relatively important as the proper breaking of an egg is to a great extent dependent upon its position upon rack 16.

6. The breaking rack having a relatively flat front member and a lower, curved rear member. It has been found desirable to have the forward edge or end of track 15 curved concavely upward to center an egg laterally upon the breaking rack. However, it has been found advantageous to have the front member somewhat higher than the rear member to prevent any possibility of eggs rolling forwardly off the rack and to prevent the opened half shells from reclosing after being released by the knives 77. If the egg shells reclosed after being released by the knives 77, the complete drainage of the final residue of white in the shells would be prevented.

7. The spacing of the white and yolk receiving receptacle a substantial distance below and only slightly forwardly displaced from the breaking rack 16. As described in the specification, it has been found that the white of an egg tends to hang together due to its gelatinous nature, and that, if sufficient space is allowed below the breaking rack, the portion of the contents first leaving the shell, if permitted to drop freely therebelow, quickly drags the last vestige of white from the shell.

8. The laterally hollowed trough or chute for breaking the vertical drop of the egg contents and guiding them into the receptacle 19 without rupturing the yolk. This feature makes possible the placing of the receptacle 19 a substantial distance below the breaking rack 16.

9. The dimensioning and shaping of the yolk cup in the separating receptacle 19 to bulge the yolks thereabove and facilitate the drainage of the white therefrom. This construction makes possible a much more complete separation of the whites and yolks than was formerly obtainable.

10. The white-retaining lip 137 on the rim 110 on separating receptacle 19. This feature renders even more complete the separation of the whites and yolks 11. The provision of small cups for initially receiving the egg contents from the separating receptacle 19 and the mechanism for lifting auxiliary cups into position as filled cups are removed for emptying. This feature, to the best of our knowledge, is entirely new in an automatic egg breaking machine, and is highly desirable as it permits careful inspection of the egg contents before they are transferred to large receptacles, and prevents the contamination of any appreciable quantity of good eggs by a rotten or musty egg.

12. The general simplification of the mechanism for operating various elements of the machine in predetermined, timed relation.

We claim:

1. In a machine of the type described, an inclined track having at its lower end a plurality of spaced-apart members for supporting an egg, a second inclined track positioned with its lower end adjacent said members, egg breaking means positioned at the opposite end of said second track, means for delivering eggs, one at a time over said first track onto said spaced members, means for pushing an egg from said spaced members along said second track to said breaking means, and means for operating all said means in timed relation.

2. In a machine of the type described, means for supporting and breaking an egg, a track for eggs to roll along to said supporting means, a spoon movable in a path above said track for rolling an egg therealong, and yieldable side walls positioned on either side of said track, said side walls being spaced apart a distance approximately equal to the length of the largest eggs to be handled by said machine.

3. In a machine of the type described, means for supporting and breaking an egg, a track for eggs to roll along to said supporting means, and a spoon movable in a path above a portion of said track for rolling an egg therealong, said spoon being configured to normally contact with an egg at two and only two laterally spaced-apart points.

4. In a machine of the type described, means for supporting and breaking an egg, a track for eggs to roll along to said supporting means, and a spoon movable in a path above a portion of said track for rolling an egg therealong, said spoon being configured to normally contact with an egg positioned crosswise on said track at two and only two laterally spaced-apart points, and said portion of said track comprising a substantially flat face centrally positioned with respect to the two egg contacting portions of the spoon whereby it contacts with an egg positioned cross wise thereupon at only one point.

5. In a machine of the type described, means for supporting and breaking an egg, a track for feeding eggs to said means, said track sloping downwardly from a predetermined point to said means, a pendulum positioned with its lower end above said track intermediate said first point and said means, to impede eggs from rolling freely along the downwardly sloping portion of said track from said point to said supporting means, means for periodically positively moving an egg along said track, and means for operating said breaking and moving means in timed relation.

6. In a machine of the type described, a rack for supporting an egg, means for breaking the egg while on said rack, a track for feeding eggs to said rack, said track sloping downward from a predetermined point to said rack, a pendulum positioned with its lower end adjacent the lower end of said rack to serve as a gate for preventing free rolling of eggs from said track to said rack, means for periodically positively moving an egg along said track, and means for operating said breaking and moving means in timed relation.

7. In a machine of the type described, a rack for supporting an egg, means for breaking the egg while on said rack, a track for feeding eggs to said rack, said track sloping downwardly from a predetermined point to said rack, a pendulum positioned with its lower end adjacent the lower end of said track to serve as a gate for preventing free rolling of eggs from said track to said rack, a second pendulum positioned above said track at a point spaced from said first pendulum by at least the thickness of an egg, for retarding the free movement of eggs along said track toward said first pendulum, means for periodically positively moving an egg along said track, and means for operating said breaking and moving means in timed relation.

8. In a machine of the type described, a rack for supporting an egg with its axis in a predetermined direction, a track extending laterally from said rack in a direction perpendicular to said predetermined direction whereby an egg rolling sidewise along said track to said rack will reach said rack with its axis in said predetermined direction, a portion of said track adjacent said rack being configured to contact with eggs rolling sidewise therealong at two points on opposite sides of their great circles, and means for moving eggs along said track to said rack.

9. In a machine of the type described, a rack for supporting an egg, and means for delivering eggs to said rack so that their axes lie in a predetermined direction, said means comprising a track extending from said rack in a direction substantially perpendicular to said predetermined direction, said track being inclined adjacent said rack whereby eggs tend to roll by gravity therealong to said rack, yieldable gate means positioned above said track adjacent said rack for restraining free movement of eggs to said rack, means for positively rolling eggs along said track to said gate comprising a spoon configured to contact at two laterally spaced points with an egg positioned crosswise on said track, that portion of the track over which the eggs are positively moved by said spoon being configured to contact with eggs thereon at one point only, and that portion of the track adjacent the rack over which eggs roll freely being configured to contact with said eggs at two points on opposite sides of their great circles, whereby eggs are delivered to said racks with their axes in said predetermined direction.

10. In a machine of the type described, a rack for supporting an egg comprising a first member and a second member spaced from said first member, said first member being substantially flat, and said second member being upwardly concave and lower at its center than the first member, means for rolling eggs onto said rack over said second member, means for holding an egg down on said member, means comprising a pair of knives for cracking an egg on the under side while held on said members and for separating the resulting half shells at their lower edges whereby the half shells slide along said members, means for releasing said knives from the shells whereby the half shells are left in open position supported solely by said members, and means for operating all said other means in timed relation.

11. In an automatic egg separating machine, means for receiving the white and yolk of an egg and separating the white from the yolk comprising a yolk cup and a separable rim extending upwardly and outwardly from the upper edge of the yolk cup, said cup being so dimensioned that its capacity, when level full, is less than the volume of the smallest yolk to be handled and having a smoothly rounded inwardly extending rim on its upper edge whereby the portion of a yolk protruding above said cup is bulged inwardly away from the lower edge of said rim, means for momentarily lifting said rim to discharge egg white, and means for thereafter tilting said cup to discharge a yolk over one edge of said cup.

12. A device for separating the yolk of an egg from the white thereof comprising a yolk cup and a separable rim extending upwardly and outwardly from the upper edge of the yolk cup, said cup being so dimensioned that its capacity when level full is less than the volume of the smallest yolk to be handled, and having a smoothly rounded inwardly extending rim on its upper edge whereby the portion of a yolk protruding above said cup is bulged inwardly away from the lower edge of said rim, means for lifting said rim to discharge egg white therewithin, and means for thereafter tilting said cup to discharge a yolk over one edge of said rim.

13. A device for separating the white from the yolk of an egg comprising a yolk cup and a separable rim extending upwardly and outwardly from the upper edge of the yolk cup, means for momentarily lifting said rim to discharge egg white, and means for thereafter tilting said cup to discharge a yolk over one edge of said rim, said rim having a smoothly rounded inwardly projecting ridge adjacent its upper edge to scrape off and trap egg white adhering to a yolk as it slides over the edge of said rim.

14. In a machine of the type described, a track, a spoon reciprocable in a path thereabove for feeding eggs therealong, a breaking rack at the delivery end of said track, clamping means for holding an egg on said rack, knives adapted to be set and released for cracking and opening an egg on said rack, a shell ejecting arm for ejecting an empty shell from said rack, a tiltable cup with a separable rim for receiving the contents of an egg opened on said rack and separating the white from the yolk, a rotatable shaft, a crank on said shaft for reciprocating said spoon along said track, a cam on said shaft for moving said clamping means against an egg on said track, a second cam on said shaft for setting said knives, means actuated by movement of said clamping means to trip said knives to crack said egg, a third cam on said shaft for lifting and lowering the rim on said cup, and a fourth cam on said shaft for tilting said cup and reciprocating said shell-ejecting arm above said rack.

WILLIAM G. YOUNG.
MORTEN HANSEN.
JOSEPH F. POLLON.